(12) United States Patent  
Jadidian et al.

(10) Patent No.: US 12,172,934 B2
(45) Date of Patent: *Dec. 24, 2024

(54) HIGH TEMPERATURE METAL CARBIDE COATINGS

(71) Applicant: Honeywell International Inc., Charlotte, NC (US)

(72) Inventors: Bahram Jadidian, Watchung, NJ (US); Mehrad Mehr, Raleigh, NC (US)

(73) Assignee: Honeywell International Inc., Charlotte, NC (US)

( * ) Notice: Subject to any disclaimer, the term of this patent is extended or adjusted under 35 U.S.C. 154(b) by 569 days.

This patent is subject to a terminal disclaimer.

(21) Appl. No.: 17/303,643

(22) Filed: Jun. 3, 2021

(65) Prior Publication Data

US 2022/0388917 A1 Dec. 8, 2022

(51) Int. Cl.
*C04B 41/45* (2006.01)
*C04B 35/83* (2006.01)
(Continued)

(52) U.S. Cl.
CPC .......... *C04B 41/4558* (2013.01); *C04B 35/83* (2013.01); *C04B 41/009* (2013.01);
(Continued)

(58) Field of Classification Search
CPC ............. C04B 41/009; C04B 41/4558; C04B 41/4556; C04B 41/5057; C04B 41/5059;
(Continued)

(56) References Cited

U.S. PATENT DOCUMENTS 4,465,777 A  8/1984 Shuford
5,022,961 A * 6/1991 Izumi ................ H01L 21/31116
                                                        438/743
(Continued)

FOREIGN PATENT DOCUMENTS

CN    102745998 A   10/2012
CN    103030427 A    4/2013
(Continued)

OTHER PUBLICATIONS

Iyer "Characterization of Composite Dust generated during Milling of Uni-Directional and Random fiber composites" Master Thesis University of Washington 2015, 196 pgs (Year: 2015).*

(Continued)

*Primary Examiner* — Nathan H Empie
(74) *Attorney, Agent, or Firm* — Shumaker & Sieffert, P.A.

(57) ABSTRACT

A method for forming a high temperature coating includes applying carbon powder to a surface of a carbon/carbon (C/C) composite substrate to force the carbon powder into one or more surface voids of the surface of the C/C composite substrate. The carbon powder has a substantially same composition and morphology as a surface portion of the C/C composite substrate. The method includes applying a metal slurry to the surface of the C/C composite substrate following the application of the carbon powder and reacting a metal of the metal slurry with carbon of the carbon powder and carbon of the surface portion of the C/C composite substrate to form a metal-rich antioxidant layer of a metal carbide on the C/C composite substrate.

12 Claims, 7 Drawing Sheets

(51) Int. Cl.
  *C04B 41/00* (2006.01)
  *C04B 41/50* (2006.01)
  *C04B 41/53* (2006.01)
  *C04B 41/87* (2006.01)
  *C04B 41/91* (2006.01)

(52) U.S. Cl.
  CPC ...... *C04B 41/4556* (2013.01); *C04B 41/5057* (2013.01); *C04B 41/5059* (2013.01); *C04B 41/5061* (2013.01); *C04B 41/53* (2013.01); *C04B 41/87* (2013.01); *C04B 41/91* (2013.01); *C04B 2235/422* (2013.01); *C04B 2235/5248* (2013.01)

(58) Field of Classification Search
  CPC ..... C04B 41/5061; C04B 41/53; C04B 41/87; C04B 41/91
  See application file for complete search history.

(56) References Cited

U.S. PATENT DOCUMENTS

| | | | |
|---|---|---|---|
| 5,283,109 | A | 2/1994 | Kaplan et al. |
| 5,352,484 | A | 10/1994 | Bernard et al. |
| 5,876,659 | A | 3/1999 | Yasutomi et al. |
| 6,551,709 | B1 * | 4/2003 | Stover ................ C04B 41/5015 428/408 |
| 6,555,173 | B1 | 4/2003 | Forsythe et al. |
| 8,383,197 | B2 | 2/2013 | La Forest et al. |
| 9,388,087 | B2 | 7/2016 | Don |
| 2004/0213906 | A1 | 10/2004 | Mazany et al. |
| 2005/0153125 | A1 | 7/2005 | Shiokawa et al. |
| 2006/0008647 | A1 | 1/2006 | Walker et al. |
| 2007/0172659 | A1 | 7/2007 | Shao |
| 2007/0199626 | A1 | 8/2007 | Diss et al. |
| 2015/0175476 | A1 | 6/2015 | Diss et al. |
| 2016/0265143 | A1 | 9/2016 | Garnier |
| 2018/0240878 | A1 * | 8/2018 | Scoggins .......... H01L 21/02529 |

FOREIGN PATENT DOCUMENTS

| | | | |
|---|---|---|---|
| CN | 103030438 | A | 4/2013 |
| CN | 105777208 | A | 7/2016 |
| CN | 107056336 | A | 8/2017 |
| CN | 107673762 | A | 2/2018 |
| CN | 109665866 | A | 4/2019 |
| EP | 0209320 | A1 | 1/1987 |
| EP | 1867619 | A2 | 12/2007 |
| JP | H0543364 | A * | 2/1993 |
| JP | 2000327461 | A * | 11/2000 .......... C04B 35/565 |
| JP | 2002274979 | A | 9/2002 |

OTHER PUBLICATIONS

Technical data sheet from Orion procured from https://orioncarbons.com/wp-content/uploads/2023/04/22_06_21_td_0112_farbrusstabelle_emea_web_2.pdf © 2021; 8 pgs. (Year: 2021).*
Extended Search Report dated Oct. 20, 2022, from counterpart European Application No. 22175325.4, 7 pp.
Response to Extended Search Report dated Oct. 20, 2022, from counterpart European Application No. 22175325.4 filed Dec. 6, 2022, 15 pp.
Wang et al., "Study on Microstructure Characteristics of Axially Braided Carbon/Carbon Composites Based on SEM and Micro-CT," MDPI, Materials, vol. 13, No. 6, doi:10.3390/ma13061414, Mar. 20, 2020, 15 pp.
Communication pursuant to Article 94(3) EPC from counterpart European Application No. 22175325.4 dated Mar. 6, 2024, 6 pp.
Response to Communication pursuant to Article 94(3) EPC dated Mar. 6, 2024, from counterpart European Application No. 22175325.4 filed May 7, 2024, 10 pp.

* cited by examiner

HIGH TEMPERATURE METAL CARBIDE COATINGS

TECHNICAL FIELD

The disclosure relates to high temperature coatings.

BACKGROUND

Carbon-carbon (C/C) composites may be used in high temperature applications. For example, the aerospace industry employs C/C composite components as friction materials for commercial and military aircraft, such as brake friction materials. In high temperature applications, C/C composites may be susceptible to oxidation, which may lead to deterioration of physio-mechanical properties.

SUMMARY

The disclosure describes high temperature coatings for carbon-carbon (C/C) composite substrates that protect against oxidation at high temperatures, and techniques for making the same. In some examples, the high temperature coatings include a metal-rich antioxidant layer of a metal carbide on a surface of the C/C composite substrate. During formation of the metal carbide, the carbon substrate may be reacted with a metal, such as silicon, titanium, or tungsten, in stoichiometric excess. A carbon powder may be utilized to enhance the formation of a continuous coating. The carbon powder has a substantially same composition and morphology, such as microstructure and phase composition, as the C/C composite substrate at the surface of the C/C composite substrate. For example, the carbon powder may be generated from the surface of the C/C composite substrate, such as through abrasion, or matched to the C/C composite substrate and applied to the surface of the C/C composite substrate. The carbon powder may be forced into one or more surface voids of the surface of the C/C composite substrate and, along with a surface portion of the C/C composite substrate, reacted with the metal. The resulting metal carbide may be formed from both carbon of the carbon powder in the surface voids and carbon of the surface portion of the C/C composite substrate, and may extend into and bridge the surface voids with portions of the metal carbide on the C/C composite substrate to form a dense antioxidant coating having a high quality, uniform crystalline metal carbide that is substantially free from defects. The metal-rich antioxidant layer may be applied to relatively large parts for which forming a substantially defect-free metal carbide coating may be difficult or expensive.

In one example, a method for forming a high temperature coating includes applying carbon powder to a surface of a carbon/carbon (C/C) composite substrate to force the carbon powder into one or more surface voids of the surface of the C/C composite substrate. The carbon powder has a substantially same composition and morphology as a surface portion of the C/C composite substrate. The method includes applying a metal slurry to the surface of the C/C composite substrate following the application of the carbon powder and reacting a metal of the metal slurry with carbon of the carbon powder and carbon of the surface portion of the C/C composite substrate to form a metal-rich antioxidant layer of a metal carbide on the C/C composite substrate.

In another example, a high temperature article includes a carbon/carbon (C/C) composite substrate and a high temperature coating on a surface of the C/C composite substrate. The high temperature coating includes a metal-rich antioxidant layer of a metal carbide on the surface of the C/C composite substrate. The metal carbide of the metal-rich antioxidant layer is formed from carbon of a carbon powder and carbon of a surface portion of the C/C composite substrate. The carbon powder has a substantially same composition and morphology as the surface portion of the C/C composite substrate. The metal-rich antioxidant layer extends into one or more surface voids of the surface of the C/C composite substrate and may enable formation of defect-free metal carbide coatings on relatively large substrates.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
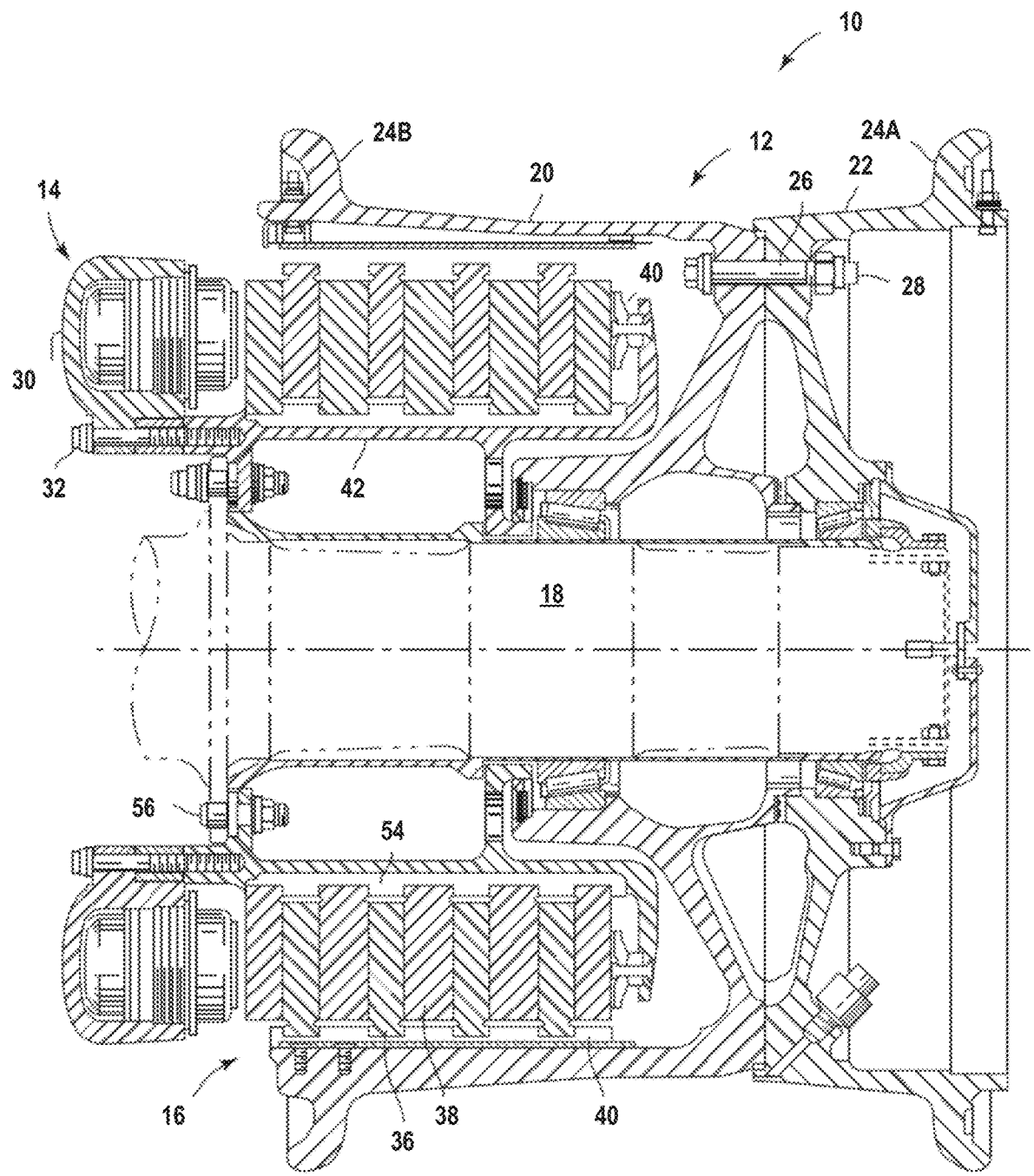
FIG. 1 is a schematic diagram illustrating an example aircraft brake assembly including composite brake disc that include a high temperature coating formed, according to examples of the disclosure.

The disclosure describes high temperature coatings for carbon-carbon (C/C) composite articles that include a C/C composite substrate and a metal-rich antioxidant layer made from a metal carbide for ultra-high temperature (e.g., greater than 1500 degrees Celsius (° C.)) applications on the C/C composite substrate.

Carbon-carbon composite components may provide good mechanical properties and have low mass density relative to other materials, such as metal alloys. However, at high temperatures, carbon-carbon composite components may be susceptible to oxidation, environmental attack, and degradation of physio-mechanical properties. Metal carbide-based antioxidant coatings may improve resistance to oxidation and/or environmental attack at high temperatures experienced in aerospace applications, such as aircraft brakes (e.g., temperatures as high as 1600° C.), and hypersonic applications, such as leading edges and rocket nozzles.

Prior to use in an oxidizing atmosphere, high temperature carbon-composite-based substrates may be coated with a metal carbide-based antioxidant coating that may reduce oxidation of an external surface of the substrate. However, a surface of the C/C composite substrate may include one or more surface voids, such as defects, cracks, pores, ripples, or machining textures, that extend into the substrate. If a surface portion of the C/C composite substrate that includes surface voids is reacted with a metal to form a metal carbide coating, the resulting metal carbide coating may not be continuous on the C/C composite substrate.

The high temperature coatings described herein may include a metal-rich antioxidant layer that extends into the surface voids of the C/C composite substrate and forms a dense barrier against oxidizing species. A metal-rich antioxidant layer of the present coatings may include a metal carbide phase formed from a metal, such as silicon, titanium, or tungsten, and reactive carbon from both a surface portion of the C/C composite substrate and carbon powder within the surface voids. Prior to reaction with the metal, the reactive carbon powder may be packed into the surface voids. This carbon powder may have a substantially same composition and/or morphology as the carbon matrix of the surface portion of the C/C composite substrate, such that the carbon powder and the carbon matrix may have substantially similar reaction thermodynamics and kinetics. As a result, during reaction with the metal, the carbon of the surface portion of the C/C composite substrate and the carbon of the carbon powder within the surface voids may react with the metal at substantially the same temperature and at substantially the same rate to form a uniform antioxidant coating that bridges the metal carbide in the voids with the metal carbide in the surface portion of the substrate. One or more additional applications of a carbon powder (e.g., slurry or dry rub), and subsequent reaction with the metal, may further patch any remaining surface voids to produce a continuous metal carbide coating.

By filling surface voids with a reactive carbon powder having a same composition and/or morphology as the carbon matrix of the surface portion of the C/C composite substrate, the resulting metal-rich antioxidant coating may have a high uniformity and/or continuity compared to a metal carbide coating formed from a carbon powder that does not have a same composition and/or morphology as the carbon matrix of the surface portion of the C/C composite substrate. A carbon powder that does not include a substantially same composition and/or morphology may react with the metal earlier or later than the carbon matrix of the surface portion of the C/C composite substrate, resulting in a metal carbide phase that does not consolidate with metal carbide formed from the surface portion of the C/C composite substrate. For example, a carbon powder that reacts with the metal before the surface portion of the C/C composite substrate reacts with the metal may migrate out of the surface void as a metal carbide powder, leaving the surface void unsealed.

High temperature coatings described herein may be used in a variety of high temperature applications. Due to high temperatures experienced by components in high speed, friction, or combustion environments, the high temperature coatings may be particularly suited to aerospace applications. FIG. 1 is a schematic diagram illustrating an example aircraft brake assembly including composite brake disc that include a high temperature coating formed, according to examples of the disclosure. For ease of description, examples of the disclosure will be described primarily with regard to aircraft brake assemblies. However, the articles of this disclosure may be used to form brake components other than aircraft brake discs, and for applications other than brake components. As one example, the brake components may be used as friction materials in other types of braking applications and vehicles. As another example, the articles may be used for leading edges, hypersonic vehicles or weapons, rocket nozzles, and other application involving high temperatures and oxidizing environments.

In the example of FIG. 1, wheel and brake assembly 10 includes a wheel 12, an actuator assembly 14, a brake stack 16, and an axle 18. Wheel 12 includes wheel hub 20, wheel outrigger flange 22, bead seals 24A and 24B, lug bolt 26, and lug nut 28. Actuator assembly 14 includes actuator housing 30, actuator housing bolt 32, and ram 34. Brake stack 16 includes alternating rotor brake discs 36 and stator brake discs 38; rotor brake discs 36 are configured to move relative to stator brake discs 38. Rotor brake discs 36 are mounted to wheel 12, and in particular wheel hub 20, by beam keys 40. Stator brake discs 38 are mounted to axle 18, and in particular torque tube 42, by splines 44. Wheel and brake assembly 10 may support any variety of private, commercial, or military aircraft or other type of vehicle.

Wheel and brake assembly 10 includes wheel 12, which in the example of FIG. 1 is defined by a wheel hub 20 and a wheel outrigger flange 22. Wheel outrigger flange 22 may be mechanically affixed to wheel hub 20 by lug bolts 26 and lug nuts 28. Wheel 12 defines bead seals 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seals 24A and 24B providing a hermetic seal for the inflatable tire.

Wheel and brake assembly 10 may be mounted to a vehicle via torque tube 42 and axle 18. In the example of FIG. 1, torque tube 42 is affixed to axle 18 by a plurality of bolts 46. Torque tube 42 supports actuator assembly 14 and stator brake discs 38. Axle 18 may be mounted on a strut of a landing gear (not shown) or other suitable component of the vehicle to connect wheel and brake assembly 10 to the vehicle.

During operation of the vehicle, braking may be necessary from time to time, such as during landing and taxiing procedures of an aircraft. Wheel and brake assembly 10 is configured to provide a braking function to the vehicle via actuator assembly 14 and brake stack 16. Actuator assembly 14 includes actuator housing 30 and ram 34. Actuator assembly 14 may include different types of actuators such as one or more of, e.g., an electrical-mechanical actuator, a hydraulic actuator, a pneumatic actuator, or the like. During operation, ram 34 may extend away from actuator housing 30 to axially compress brake stack 16 against a compression point for braking.

Brake stack 16 includes alternating rotor brake discs 36 and stator brake discs 38. Rotor brake discs 36 are mounted to wheel hub 20 for common rotation by beam keys 40. Stator brake discs 38 are mounted to torque tube 42 by splines 44. In the example of FIG. 1, brake stack 16 includes four rotors and five stators. However, a different number of rotors and/or stators may be included in brake stack 16 in other examples.

In some examples, rotor brake discs 36 and stator brake discs 38 may be mounted in wheel and brake assembly 10 by beam keys 40 and splines 44, respectively. In some examples, beam keys 40 may be circumferentially spaced about an inner portion of wheel hub 20. Beam keys 40 may, for example, be shaped with opposing ends (e.g., opposite sides of a rectangular) and may have one end mechanically affixed to an inner portion of wheel hub 20 and an opposite end mechanically affixed to an outer portion of wheel hub 20. Beam keys 40 may be integrally formed with wheel hub 20 or may be separate from and mechanically affixed to wheel hub 20, e.g., to provide a thermal barrier between rotor brake discs 36 and wheel hub 20. Toward that end, in different examples, wheel and brake assembly 10 may include a heat shield (not shown) that extends out radially and outwardly surrounds brake stack 16, e.g., to limit thermal transfer between brake stack 16 and wheel 12.

In some examples, splines 44 may be circumferentially spaced about an outer portion of torque tube 42. As such, stator brake discs 38 may include a plurality of radially inwardly disposed lug notches along an inner diameter of the brake disc configured to engage with splines 44. Similarly, rotor brake discs 36 may include a plurality of radially inwardly disposed lug notches along an outer diameter of the brake disc configured to engage with beam keys 40. As such rotor brake discs 36 will rotate with the motion of the wheel while stator brake discs 38 remain stationary allowing the friction surfaces of an adjacent stator brake disc 38 and rotor brake disc 36 to engage with one another to deaccelerate the rotation of wheel 12.

Rotor brake discs 36 and stator brake discs 38 may provide opposing friction surfaces for braking an aircraft. As kinetic energy of a moving aircraft is transferred into thermal energy in brake stack 16, temperatures may rapidly increase in brake stack 16. As such, rotor brake discs 36 and stator brake discs 38 that form brake stack 16 may include coatings capable of operating at very high temperatures and blocking various oxidizing species.

Figure 2:
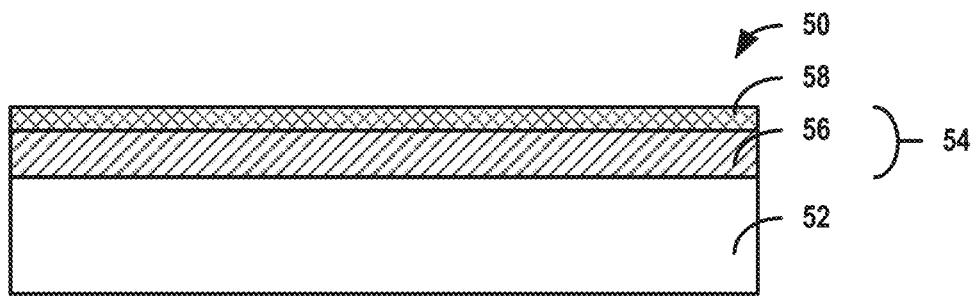
FIG. 2 is a cross-sectional side view diagram illustrating an example article that includes a high temperature coating, according to examples of the disclosure.

In some examples, articles or components, such as brake discs 36 and/or 38 of FIG. 1 described above, may include a high temperature coating to protect an underlying substrate from oxidation, such as non-friction surfaces of brake discs. Non-friction surfaces of brake discs 36 may include those surfaces of brake discs 36 that do not engage another opposing surface during, e.g., a braking operation of assembly 10 when the friction surfaces of brake discs 36 are engaged. FIG. 2 is a cross-sectional side view diagram illustrating an example high temperature article that includes a high temperature coating, according to examples of the disclosure.

High temperature article 50 includes a carbon/carbon (C/C) composite substrate 52. Substrate 52 may include carbon-based reinforcement fibers and a carbon-based matrix material at least partially surrounding the carbon-based reinforcement fibers. In some examples, substrate 52 may be formed form a porous preform that includes carbon fibers or carbon-precursor fibers. Examples of porous preforms that may be used to produce substrate 52 include, but are not limited to: a fibrous preform, such as a woven fiber preform, a nonwoven fiber preform, a chopped-fiber and binder preform, a binder-treated random fiber preform, a carbon fiber preform, or a ceramic fiber preform; a foam preform; a porous carbon body preform; or a porous ceramic body preforms.

In some examples, the porous preform includes a plurality of mechanically bound layers, which can be, for example, a plurality of fibrous layers, such as a plurality of woven or nonwoven fabric layers, connected together, e.g., bound by a binder, such as a resin binder, or via needle-punching of the plurality of layers. In some examples, the layers include one or more tow layers, one or more web layers, or combinations thereof. Tow layers may include one or more tows of fibers. Tows of fibers may be arranged in any suitable arrangement including, for example, linear, radial, chordal, or the like. Web layers may include web fibers, which may include relatively short, chopped, and entangled fibers of fibers. In other examples, the porous preform may not include predefined layers, but, rather, may be formed from a bundle of fibers that are mechanically bound together, e.g., via needling. In other examples, a combination of any of the aforementioned types of porous preforms can be used.

Substrate 52 may also include a matrix material that at least partially encapsulates the carbon fibers. The matrix material may be introduced into the porous preform using one or more of a variety of techniques, including, for example, chemical vapor deposition/chemical vapor infiltration (CVD/CVI), resin transfer molding (RTM), vacuum/pressure infiltration (VPI), high pressure impregnation/carbonization (PIC), or the like.

Substrate 52 may be subject to high temperatures during operation. As one example, carbon-carbon composite brake discs may be subject to temperatures as high as about 3,000 degrees Fahrenheit (° F.) (about 1,649° C.) during braking events. To protect substrate 52 from oxidation, article 50 includes a high temperature coating 54 on one or more surfaces of substrate 52. Coating 54 may be stable at temperatures of up to about 3600° F. (about 2000° C.). In this context, "stable" may mean that coating 54 does not degrade into its constituent elements, does not react with carbon, and/or does not react with other elements or compounds present in the environment in which coating 54 is used including, but not limited to, oxidation, for a period of time (e.g., minutes or hours). Coating 54 may have any suitable thickness. In some examples, a thickness of coating 54 may be between about 1 micrometer (μm) and about 30 μm. In some examples, a thickness of coating 54 may be self-terminating and determined by diffusion properties of the metal carbon system.

High temperature coating 54 includes a metal-rich antioxidant layer 56 on a surface of substrate 52. Metal-rich antioxidant layer 56 includes a metal carbide. Metal carbides may have high strength, wear-resistance, and temperature resistance, and may be chemically compatible with underlying substrate 52. In some examples, the metal carbide includes at least one of silicon carbide, titanium carbide, or tungsten carbide.

As will be explained further in FIGS. 4A-4F below, a metal-rich antioxidant layer—in the example of FIG. 2, layer 56—extends into one or more surface voids, such as defects or pores, on the surface of the C/C composite substrate 52 to form a continuous layer that substantially encapsulates substrate 52. For example, substrate 52 may include surface voids that extend from an outer surface of substrate 52 into a bulk of substrate 52. Surface voids may include defects such as cracks, inherent structures such as surface pores, or other voids or roughness in the surface that extend into substrate 52 and may have relatively complex or irregular surfaces. These surface voids may form discontinuities in a metal carbide layer formed from substrate 52 and permit oxidizing species to react with the underlying substrate 52. Metal-rich antioxidant layer 56 may be formed by reacting a metal with both a surface portion of C/C composite substrate 52 and carbon powder packed into the surface voids, such that portions of metal-rich antioxidant layer 56 may extend into and substantially fill surface voids, such as defects or pores, in the surface of substrate 52 and bridge with portions of metal-rich antioxidant layer 56 on the remaining unreacted C/C composite substrate 52 to form a substantially continuous coating.

To form a uniform, defect-free coating, metal-rich antioxidant layer 56 may include a metal carbide that is formed from both carbon matrix of a surface portion of C/C composite substrate 52 and carbon powder within the surface voids having a substantially same composition and morphology as the surface portion of C/C composite substrate 52. For example, prior to reaction with a metal, substrate 52 may include a surface portion (e.g., outer-most 10-20 microns) that includes carbon matrix capable of reacting with the metal to form a metal carbide. Without being limited to any particular theory, the carbon matrix of the surface portion may have a particular composition and/or morphology, such as microstructure, phase composition, geometry of component phases, morphology of components phases, and/or dimensions and distribution of ceramic fibers or pores, crystal structure, presence and type of impurities, particle morphology shape and size, crystal surface terminations (e.g., active facets), crystal defects, and/or surface functionalization. This particular composition and/or morphology may result in a reaction with the metal according to particular reaction thermodynamics and kinetics, such as a temperature of reaction and a rate of reaction.

Similarly, prior to reaction with a metal, carbon powder filling the surface voids may have a similar composition and/or morphology as the surface portion of substrate 52. As a result of a substantially similar composition and/or morphology as the surface portion of substrate 52, the carbon powder may have a substantially similar reaction thermodynamics and kinetics as the surface portion of substrate 52. By forming a metal carbide formed from both the carbon matrix of the C/C composite substrate 52 and carbon powder having a substantially same composition and/or morphology as C/C composite substrate 52, metal-rich antioxidant layer 56 may be formed at substantially the same time and rate, thereby bridging metal carbide in the surface voids with metal carbide on unreacted C/C composite substrate 52.

Metal-rich antioxidant layer 56 may be metal-rich, such that metal-rich antioxidant layer 56 may include a metal carbide having metal in stoichiometric excess. For example, during formation of the metal carbide from the carbon matrix of the surface portion of substrate 52 and the carbon powder in the surface voids, a portion of excess metal may remain in metal-rich antioxidant layer 56. During operation of article 50, the metal may form a metal oxide that may migrate to form a passivation layer, such as an outer layer 58 described below, or may fill small cracks or pores in metal-rich antioxidant layer 56 caused by a difference in coefficient of thermal expansion between substrate 52 and metal-rich antioxidant layer 56, such as by expanding through oxidation of the excess metal at high temperatures in the presence of oxidation during operation. As a result, the metal of metal-rich antioxidant layer 56 may perform a passivation and/or self-healing function to further protect substrate 52.

In some examples, coating 54 includes an outer layer 58 of a metal oxide on metal-rich antioxidant layer 54. For example, metal that reacts with the carbon matrix of the surface portion of C/C composite substrate 52 and the carbon powder in the surface voids during formation of metal-rich antioxidant layer 56 may be applied to the surface of C/C composite substrate 52 as metal powder or particles. This metal powder may include metal oxide surface layers that form in an oxidizing atmosphere, such as an oxide of the underlying metal or an oxide of a different element. For example, the metal oxide surface layers may have a thickness between about 1 nanometer and about 1 micrometer. During formation of metal-rich antioxidant layer 56, the metal oxides may migrate to a surface of metal-rich antioxidant layer 56 and form outer layer 58. Outer layer 58 may have a relatively high temperature resistance, such as greater than about 1500° C. In this way, metal oxides that may otherwise be present in the metal powder as impurities may form a further protective layer to protect substrate 52 from oxidation.

Figure 3:
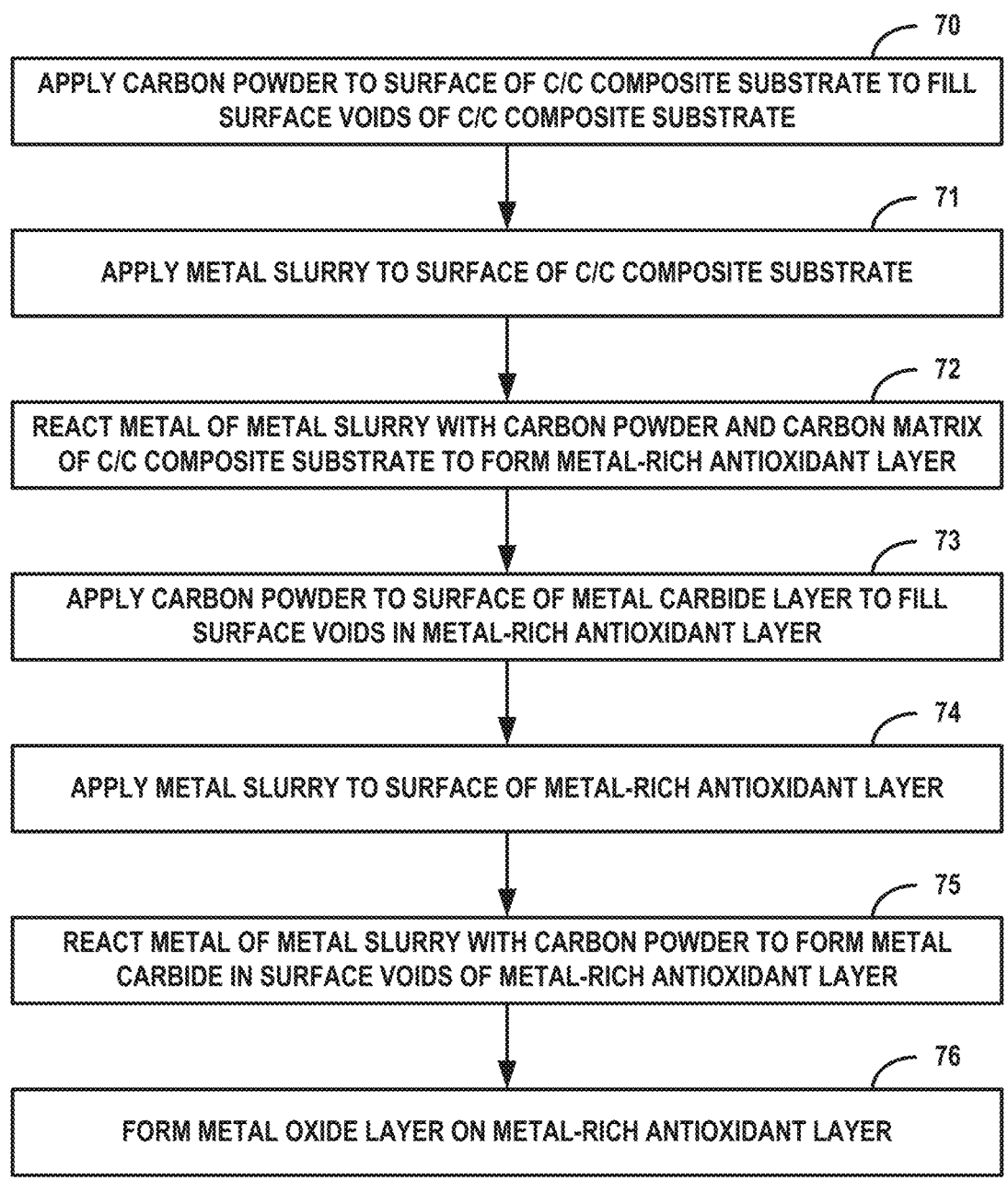
FIG. 3 is a flow diagram illustrating an example technique for forming a high temperature coating, according to examples of the disclosure.

High temperature antioxidant coatings described herein, such as coating 54 of FIG. 2 above, may be formed in situ on C/C composite substrates to form denser coatings that may continuously encapsulate the C/C composite substrate. FIG. 3 is a flow diagram illustrating an example technique for forming a high temperature coating, according to examples of the disclosure. The example technique of FIG. 3 will be described with respect to FIGS. 4A-4F, which illustrate various steps for forming high temperature antioxidant coatings, and FIG. 5, which illustrates an example system or sequence of systems for forming a high temperature coating.

Figure 4A:
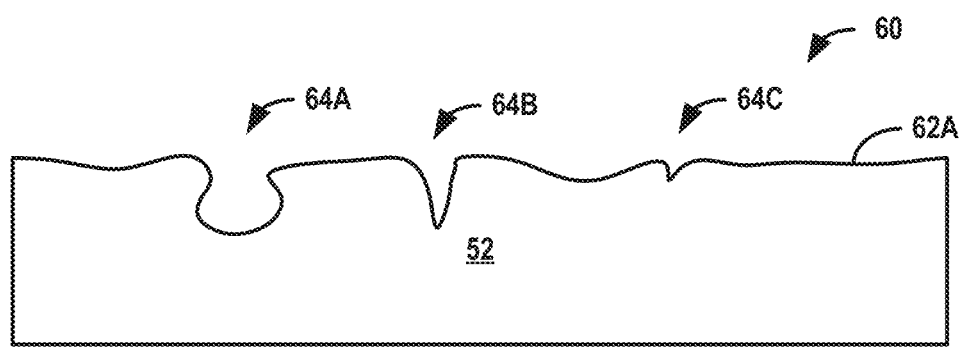
FIG. 4A is a cross-sectional side view diagram illustrating a portion of an example C/C composite substrate that includes surface voids, according to examples of the disclosure.

As described above with respect to substrate 52 of FIG. 2, substrate 52 may include various surface voids that, if left unsealed or partially sealed, may permit oxidizing species to penetrate into and react with substrate 52. FIG. 4A is a cross-sectional side view diagram illustrating a portion 60 of an example C/C composite substrate 52, according to examples of the disclosure. Substrate 52 defines an initial outer surface 62A. Surface 62A includes one or more surface voids 64A, 64B, 64C (individually "void 64" and collectively "voids 64"). Voids 64 may include any irregularity or deviation from a general plane of surface 62A that may otherwise produce a discontinuity in a metal carbide coating formed from the surface portion of substrate 52 unless filled. For example, a pore having high curvature may result in inhibited reaction with a metal, and thus may be a void 64 to be filled, while a shallow depression having low curvature may not result in inhibited reaction with an infiltrated metal, and thus may not be a void 64 to be filled. In some examples, voids 64 may include one or more pores 64A, one or more cracks 64B, and/or one or more surface projections or depressions 64C. These voids 64 may be formed during formation of substrate 52, and manufacturing efforts to reduce voids 64 may be relatively expensive. Voids 64 may have relatively complex surfaces that define relatively complex volumes that may be difficult to fill. For example, relatively large reactant particle size and/or high slurry viscosity may limit penetration of metal reactants into voids 64.

Figure 4B:
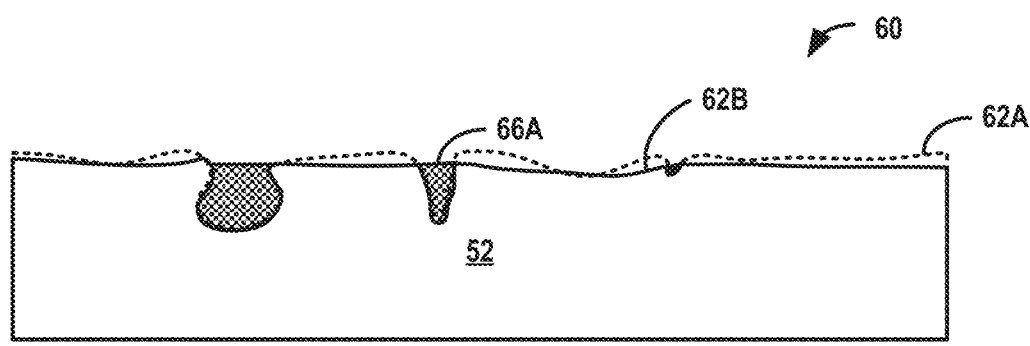
FIG. 4B is a cross-sectional side view diagram illustrating the portion of the example C/C composite substrate of FIG. 4A with carbon powder filling the surface voids, according to examples of the disclosure.

Referring back to FIG. 3, the example technique includes applying carbon powder to a surface of a carbon/carbon (C/C) composite substrate to fill surface voids of the C/C composite substrate (70). Applying the carbon powder to the surface may include coating the surface of the C/C composite substrate with the carbon powder and forcing the carbon powder into one or more surface voids of the surface of the C/C composite substrate. FIG. 4B is a cross-sectional side view diagram illustrating portion 60 of the example C/C composite substrate 52 of FIG. 4A with a carbon powder 66A filling surface voids 64, according to examples of the disclosure. Applying carbon powder 66A to a surface 62B may include distributing carbon powder 66A on surface 62B and forcing carbon powder 66A into one or more voids 64 of surface 62B (e.g., to pack or at least partially fill the surface voids with powder). As a result, carbon powder 66A may penetrate into voids 64.

Carbon powder 66A may have a substantially same composition and morphology as a surface portion of C/C composite substrate 52 at or near surface 62B. For example, the microstructure and/or crystallinity of carbon powder 66A may be substantially the same as the microstructure and/or crystallinity of material of substrate 52 near surface 62B and voids 64. Carbon powder 66A having a substantially same composition and morphology as the surface portion of C/C composite substrate 52 may have a substantially same reaction thermodynamics and kinetics as the surface portion of C/C composite substrate 52, such that reaction of an infiltrated metal with carbon powder 66A and carbon matrix of a surface portion of C/C composite substrate 52 may occur at substantially the same temperature and substantially the same rate. As explained above, reaction thermodynamics and kinetics of each of carbon powder 66A and the carbon matrix of C/C composite substrate 52 may be a product of a respective type, feedstock source, processing history, and other properties and conditions of carbon powder 66A and C/C composite substrate 52 that influence a temperature and rate at which carbon powder 66A and the carbon matrix of C/C composite substrate 52 may react with an infiltrated metal.

In some examples, applying carbon powder 66A to surface 62B of substrate 52 may include applying carbon powder 66A as a separate powder in a slurry or mixture to surface 62B of substrate 52. As one example, carbon powder 66A may be ground from one or more portions of substrate 52 and/or from feedstock similar in composition and/or morphology to substrate 52 and applied to surface 62B. For example, during processing of C/C composite substrate 52, carbon powder may be produced through various abrasive or other operations. This carbon powder may be further processed, such as by milling, to produce carbon powder 66A having a similar processing history as C/C composite substrate 52. As another example, carbon powder 66A may be selected or obtained having a composition and/or morphology that substantially matches the composition and/or morphology of the surface portion of substrate 52 and applied to surface 62. For example, carbon powder 66A may be selected or obtained from a feedstock produced under similar processing conditions as C/C composite substrate 52.

In some examples, applying carbon powder 66A to surface 62B of substrate 52 may include applying a force to surface 62B to force and pack carbon powder 66A into voids 64. For example, the force may include a normal force to surface 62B and/or any lateral forces to spread and/or fill voids 64. The force applied to carbon powder 66A may force carbon powder 66A into surface voids 64 prior to forming a metal carbide and pack carbon powder 66A into surface voids 64, such that carbon powder 66A is retained in surface voids 64, such as up to between about 50 vol. % and about 60 vol. % packing. In some instances, a carrier medium may be applied to carbon powder 66A, such as a volatile medium to aid in dispersing carbon powder 66A into voids 64. For example, carbon powder 66A may be dispersed in the carrier medium to form a slurry corresponding to a relatively high packing. A variety of methods may be used to force and pack carbon powder 66A into surface voids 64 including, but not limited to: rotary forces, such as polishing or abrasion; linear forces, such as spackling; manual forces, such as manual sanding (e.g., to generate and force carbon powder 66A); and the like.

In some examples, such as illustrated in FIG. 4B, applying carbon powder 66A to surface 62B of C/C composite substrate 52 may include generating carbon powder 66A directly from substrate 52 by mechanically abrading surface 62A of C/C composite substrate 52. In the example of FIG. 4B, substrate 52 has been abraded to surface 62B from surface 62A, as indicated by the dashed line. For example, rather than separately apply carbon powder 66A, which may be difficult to match to substrate 52, and force carbon powder 66A in a separate step, abrading surface 62A may both generate carbon powder 66A having a substantially same composition and/or morphology as substrate 52 and force carbon powder 66A into voids 64 in a single step. Even within substrate 52, a composition and/or morphology may vary, such as due to different temperatures during formation of substrate 52, such that directly obtaining carbon powder 66A from portions of substrate 52 near surface 62 may generate carbon powder that matches the composition and/or morphology of the material around voids 64. The resulting carbon powder 66A may have an identical composition and morphology as substrate 52 near surface 62B, may be generated proximate to voids 64, and may penetrate into voids 64 without the use of a carrier medium.

Excess carbon powder 66A may be removed from surface 62 prior to reaction with the metal of a metal slurry or mixture, such that surface voids 64 may include carbon powder 66A while low curvature or planar surfaces of surface 62B may not include carbon powder 66A. For example, if carbon powder 66A remains on low curvature or planar portions of surface 62B and is subsequently reacted with a metal, a resulting metal carbide may not strongly adhere to a surface of C/C composite substrate 52, and may be subject to delamination. In some examples, excess carbon powder 66A may be removed from non-void surfaces of surface 62B during packing of carbon powder 66A, such as by polishing surface 62B to force carbon powder 66A into voids 64 while wiping away carbon powder 66A on low curvature or planar surfaces of surface 62B.

Figure 5:
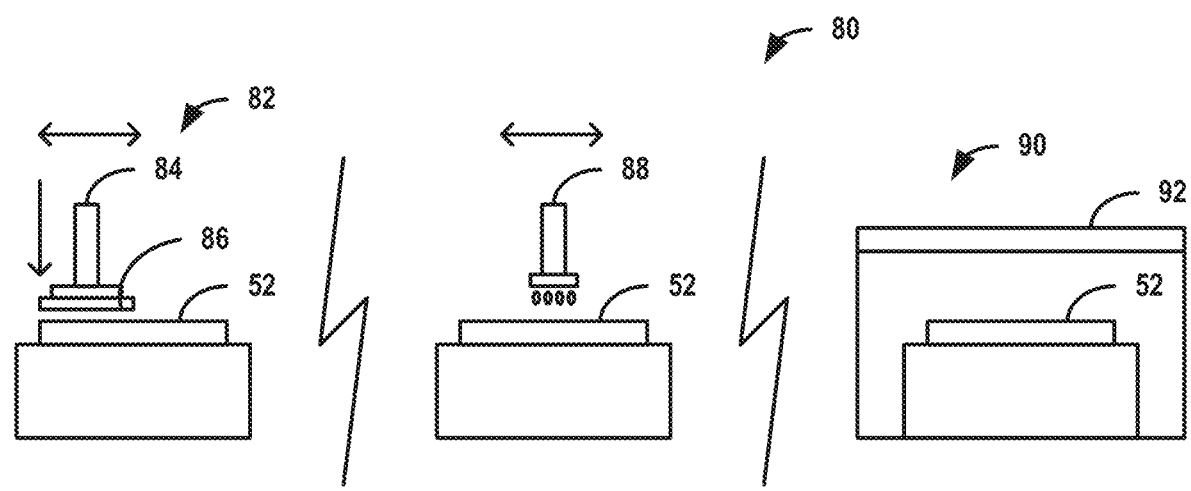
FIG. 5 is a schematic diagram illustrating an example system for forming a high temperature coating on a C/C composite substrate, according to examples of the disclosure.

Referring to FIG. 5, system 80 may include an abrasion system 82 configured to mechanically abrade surface 62 of substrate 52. Abrasion system 82 may include an abrasive surface 86 configured to abrade a surface of substrate 52. Abrasion system 82 may include an actuation system 84 coupled to abrasive surface 86. In some examples, actuation system 84 may be configured to generate a rotary force to rotate abrasive surface 86 or a linear force to drive abrasive surface 86 (e.g., belt). In some examples, actuation system 84 may be configured to exert a lateral force to move abrasive surface 86 to different portions of substrate 52 and exert a downward force on abrasive surface 86 to abrade the surface of substrate 52 and force carbon powder generated from the abrasion into surface voids of substrate 52.

Figure 4C:
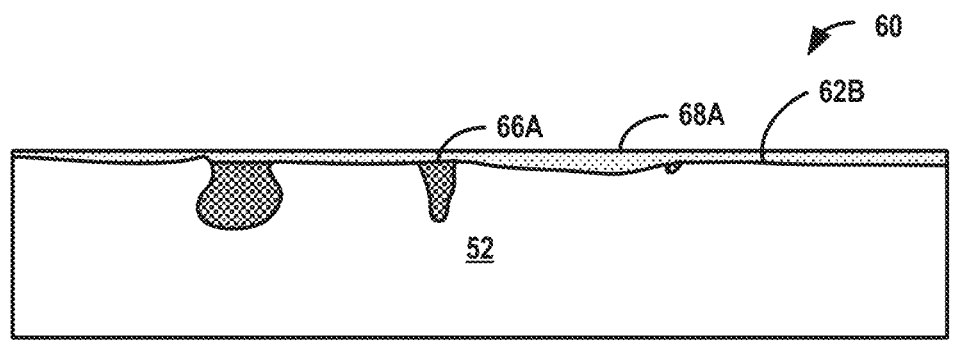
FIG. 4C is a cross-sectional side view diagram illustrating the portion of the example C/C composite substrate of FIG. 4A with carbon powder filling surface voids and a metal slurry on the C/C composite substrate, according to examples of the disclosure.

Referring back to FIG. 3, the example technique includes applying a metal slurry to the surface of the C/C composite substrate (71). FIG. 4C is a cross-sectional side view diagram illustrating portion 60 of the example C/C composite substrate 52 of FIG. 4A with carbon powder 66A filling voids 64 and a metal slurry 68A on C/C composite substrate 52, according to examples of the disclosure. While illustrated as a metal slurry 68A, the metal may be applied in any form, including as a liquid or gas.

Metal slurry 68A may include metal particles in an application medium. In some examples, the metal particles of metal slurry 68A include at least one of silicon, titanium, or tungsten. The metal particles may be coated by a thin layer of a metal oxide, such as may be formed in an oxidizing atmosphere during formation or shelf-life of the metal particles. For example, a relatively pure feedstock of metal particles may be prohibitively expensive due to inert storage, such that use of metal particles that include a metal oxide film may broaden available feedstocks of material for the metal particles and/or reduce a cost of the metal particles.

Referring to FIG. 5, system 80 may include a metal application system 88. Metal application system 88 may be configured to apply the metal slurry to a surface of substrate 52. While illustrated in FIG. 5 as a spray system, metal application system 88 may include any system configured to apply a metal slurry to the surface of substrate 52, such as a brush system.

Figure 4D:
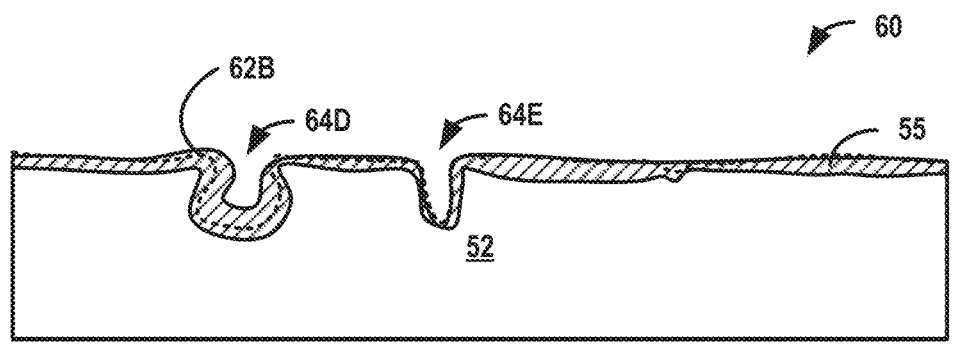
FIG. 4D is a cross-sectional side view diagram illustrating the portion of the example C/C composite substrate of FIG. 4A and a metal-rich antioxidant layer that includes a surface void, according to examples of the disclosure.

Referring back to FIG. 3, the example technique includes reacting a metal of the metal slurry with carbon of the carbon powder and carbon of the surface portion of the C/C composite substrate to form a metal-rich antioxidant layer of a metal carbide on the C/C composite substrate (72). FIG. 4D is a cross-sectional side view diagram illustrating portion 60 of the example C/C composite substrate 52 of FIG. 4A and a metal-rich antioxidant layer 56A, according to examples of the disclosure. To react the metal of metal slurry 68A with the carbon of carbon powder 66A and the carbon of the surface portion of C/C composite substrate 52, the metal may be fluidized (e.g., melted or sublimated) such that the metal may infiltrate into carbon powder 66A and the surface portion of C/C composite substrate 52 and react with carbon of carbon powder 66A and carbon matrix of the surface portion of C/C composite substrate 42 to form a metal carbide. This metal carbide may form a continuous metal-rich antioxidant layer 56A to substantially seal C/C composite substrate 52.

In some instances, this reaction may be limited by diffusion of the metal into the surface portion of C/C composite substrate 52 and carbon powder 66A. As the metal reacts with the surface portion of C/C composite substrate 52 and forms a metal carbide, the newly formed metal carbide may form a diffusion barrier separating the reactants (e.g., carbon and metal), which may stop the thickening and further creation to form thicker metal carbides (e.g., by preventing metal from further penetrating into a depth of the surface portion of C/C composite substrate 52 and/or preventing diffusion of carbon out of C/C composite substrate 52 to react with the metal). On the other hand, as the metal reacts with carbon powder 66A and forms a metal carbide, the powder form of carbon powder 66A may permit the metal to continue to infiltrate around carbon powder 66A, such that a thickness of metal carbide in surface voids 64 may be greater than a thickness of metal carbide on C/C composite substrate 52. In some examples, a size of carbon powder 66A may correspond to a size for which the metal may infiltrate and react (e.g., less than a diffusion limit), such as less than about 20 micrometers (µm), or between about 1 µm and about 5 µm. In contrast, a size of surface voids 64 may be greater than about 100 µm, such as between about 100 µm and about 1000 µm. The metal may be applied to surface 62B of C/C composite substrate 52 until the reaction ends either by diffusion limitation, metal evaporation or exhaustion, or both. For example, any remaining metal on surface 62 may be removed, such as through evaporation. The resulting layer 56A may be a relatively homogeneous metal carbide having a relatively uniform thickness that may include some deviations to fill voids 64. In some examples, a thickness of metal-rich antioxidant layer 56A at a surface of C/C composite substrate 52 is less than about 50 microns, such as between about 10 microns and about 20 microns. In some examples, a thickness of metal-rich antioxidant layer 56A in surface voids 64 may be substantially thicker than the thickness of metal-rich antioxidant layer 56A at the surface of C/C composite substrate 52.

Reaction of the metal of metal slurry 68A with carbon of carbon powder 66A and carbon matrix of the surface portion of C/C composite substrate 52 may be performed under stoichiometric excess of the metal, such that the resulting metal carbide antioxidant layer 56 is metal-rich. Metal-rich may include a metal carbide phase that includes excess free metal. For example, a metal-rich metal carbide phase may include a stoichiometric ratio of the metal to the carbon of the carbon powder that is greater than 1.1, such as greater than about 1.001:1. By performing the reaction at stoichiometric excess of the metal, the resulting metal-rich antioxidant layer 56A may include excess metal. During formation of metal-rich antioxidant layer 56A or during operation of substrate 52 (e.g., as a component), the excess metal may form a metal oxide. In some instances, such as will be described in FIG. 4H, the metal oxide may form a passivation layer that further protects substrate 52. In some instances, the metal oxide may perform a self-healing function for metal-rich antioxidant layer 56A. For example, the metal oxide may migrate into small cracks that may form during operation, such as due to mismatch in CTE or volumetric expansion, and seal the cracks.

In some examples, reacting the metal of metal slurry 68A with the carbon of carbon powder 66A may include heating surface 62 of substrate 52 above a melting point of the metal and maintaining a vapor pressure of the metal at surface 62 of substrate 52 in stoichiometric excess. A variety of parameters, such as a temperature at surface 62, a concentration (e.g., as indicated by pressure) of the metal at surface 62, and a time of reaction, may be controlled to maintain the metal at stoichiometric excess and encourage migration of the metal into, and reaction with, carbon powder 66A and carbon of the surface portion of C/C composite substrate 52. As one example, for a metal of silicon, the temperature may be maintained at greater than about 1400° C., the pressure may be maintained between about 0.1 mTorr and about 300 mTorr, and the temperature and pressure may be maintained for greater than about one hour.

Referring to FIG. 5, system 80 may include a furnace 90 configured to enclose substrate 52. Furnace 90 may include one or more heaters configured to heat metal particles of metal slurry 68A above the melting point of the metal. Furnace 90 may be configured to maintain a temperature and pressure of the metal such that the metal maintains stoichiometric excess to form a dense first layer 56A. In some instances, furnace 90 may be configured to heat substrate 52 to conductively heat metal slurry 68A. For example, while not shown in FIG. 5, one or more heaters or electrical contacts may be configured to heat (or generate heat within) substrate 52 to heat metal slurry 68A and react the metal of metal slurry 68A with the carbon of carbon powder 66A.

In some instances, the resulting metal-rich antioxidant layer may still include one or more surface voids. As one example, a surface void in the C/C composite substrate may be substantially large that the carbon powder in the surface void may not react at a same time, resulting in smaller remaining surface voids. As another example, a surface void in the metal-rich antioxidant layer may extend to a surface of the C/C composite substrate, such as due to pinholes in the metal-rich antioxidant layer. In the example of FIG. 4D, metal-rich antioxidant layer 56 includes smaller surface defects 64D and 64E at previous surface defects 64A and 64B, respectively. To fill surface defects 64D and 64E, the method of FIG. 3 may include patching one or more surface voids remaining on the C/C composite substrate and/or surface voids created while forming the metal-rich antioxidant layer.

Figure 4E:
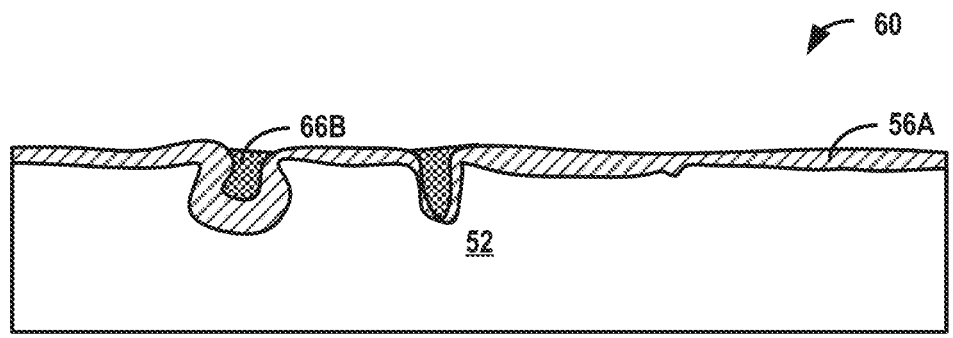
FIG. 4E is a cross-sectional side view diagram illustrating the portion of the example C/C composite substrate of FIG. 4A and a first metal-rich antioxidant layer with carbon powder filling a surface void in the metal-rich antioxidant coating, according to examples of the disclosure.

Referring back to FIG. 3, the example technique may include applying a second carbon powder to a surface of the metal-rich antioxidant layer and applying a second metal slurry to the surface of the other metal-rich antioxidant layer (73). FIG. 4E is a cross-sectional side view diagram illustrating portion 60 of the example C/C composite substrate 52 of FIG. 4A and a metal-rich antioxidant layer 56A with carbon powder 66B filling surface voids 64D and 64E in antioxidant coating 56A, according to examples of the disclosure. In the example of FIG. 4E, second carbon powder 66B may be applied to a surface of metal-rich antioxidant layer 56A. In some examples, carbon powder 66B has a substantially same composition or morphology as carbon powder 66A used to form metal-rich antioxidant layer 56A. Rather than abrade surface 62 of substrate 52 to generate carbon powder, carbon powder 66B may be applied as a slurry or dry powder rub.

Figure 4F:
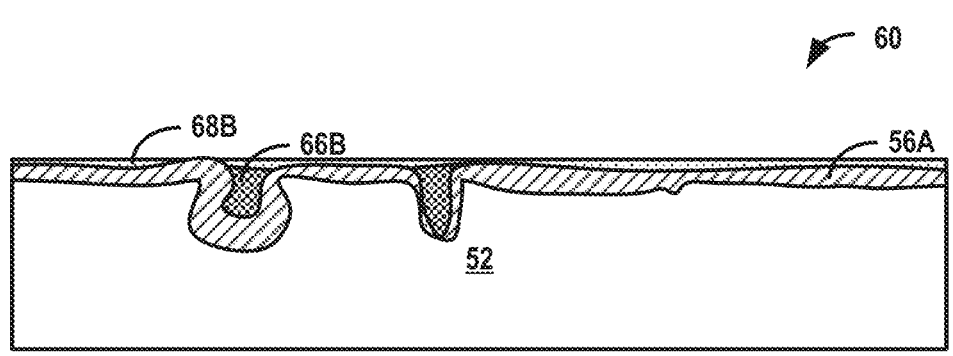
FIG. 4F is a cross-sectional side view diagram illustrating the portion of the example C/C composite substrate of FIG. 4A, a first metal-rich antioxidant layer with carbon powder filling a surface void in the metal-rich antioxidant coating, and a metal slurry on the metal-rich antioxidant coating, according to examples of the disclosure.

Referring back to FIG. 3, in some examples, the example technique may include applying a second metal slurry to the surface of the metal-rich antioxidant layer (74). FIG. 4F is a cross-sectional side view diagram illustrating portion 60 of the example C/C composite substrate 52 of FIG. 4A, a metal-rich antioxidant layer 56A with carbon powder 66B filling surface voids 64D and 64E in metal-rich antioxidant coating 56A, and a metal slurry 68B on the metal-rich antioxidant coating 56A, according to examples of the disclosure. For example, metal-rich antioxidant coating 56A may include surface void 64E that extends to a surface of C/C composite substrate 52. Application of second metal slurry 68B may be similar to application of first metal slurry 68A (71).

Figure 4G:
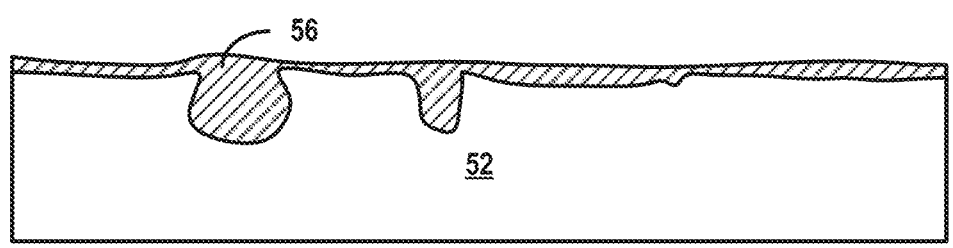
FIG. 4G is a cross-sectional side view diagram illustrating the portion of the example C/C composite substrate of FIG. 4A, a metal-rich antioxidant layer, and an outer oxide layer, according to examples of the disclosure.

Referring back to FIG. 3, the example technique may include reacting a metal of the second metal slurry with carbon of the second carbon powder to form a metal carbide in the one or more surface voids (75). FIG. 4G is a cross-sectional side view diagram illustrating portion 60 of the example C/C composite substrate 52 of FIG. 4A and a metal-rich antioxidant layer 56, according to examples of the disclosure. The metal of metal slurry 68B may react with the carbon of carbon powder 66B to form a metal carbide in previous surface defect 64D. As a result, metal-rich antioxidant layer 56 may include fewer surface voids than metal-rich antioxidant layer 56A formed from only a single application of a carbon powder and metal slurry. Reaction of the metal of metal slurry 68B with carbon of carbon powder 66B may be carried out under similar conditions and using similar processes as reaction of the metal of metal slurry 68A with carbon of carbon powder 66A (72).

While illustrated in FIGS. 4E-4G as a single additional patching process, in some examples, steps 73-75 of FIG. 3 may be repeated for multiple iterations to form a continuous, substantially defect-free metal-rich antioxidant layer 56, and may include additional processing steps such as cleaning or brushing metal-rich antioxidant layer 56A such that any loose carbides or carbon powder is removed prior to additional coatings.

Figure 4H:
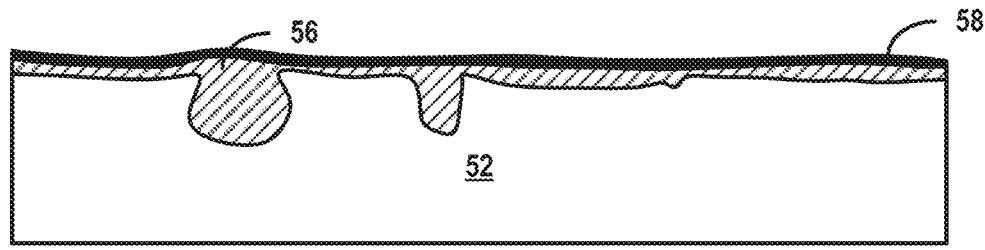
FIG. 4H is a cross-sectional side view diagram illustrating the portion of the example C/C composite substrate of FIG. 4A, a metal-rich antioxidant layer, and an outer oxide layer, according to examples of the disclosure.

Referring back to FIG. 3, in some examples, the example technique includes forming a metal oxide layer on the high temperature antioxidant coating. FIG. 4H is a cross-sectional side view diagram illustrating the portion of the example C/C composite substrate of FIG. 4A, a metal-rich antioxidant layer 56, and an outer oxide layer 58, according to examples of the disclosure. Metal slurries 68A and 68B of FIGS. 4C and 4E may include metal particles coated by a layer of a metal oxide, such a silicon oxide, titanium oxide, and/or tungsten oxide. During heating of surface 62, at least a portion of the metal oxide from the metal particles may go into solution and migrate from the respective metal slurry 68A or 68B to a surface of the metal-rich antioxidant layer 56. Upon cooling, the metal oxide may form outer oxide layer 58 of the metal oxide on the metal-rich antioxidant layer 56. In some examples, rather than or in addition to forming outer oxide layer 56, at least a portion of the metal oxide may remain in metal-rich antioxidant layer 56, such that, during operation of a component that includes substrate 52, the metal oxide may be available to migrate to one or more cracks formed in metal-rich antioxidant layer 56.

Experimental Methods

In a first example, a high temperature silicon carbide coating was formed on a C/C composite substrate. A surface of the C/C composite substrate was abraded with a rotary machine to generate carbon powder and force the carbon powder into one or more surface voids of the C/C composite substrate. A slurry of silicon particles coated that may have included a layer of native oxide, such as silicon dioxide, was applied to the surface of the C/C composite substrate in stoichiometric excess sufficient to react up to 20-30 microns of the surface, as well as compensate for evaporation and other losses (e.g., for silicon, about 0.02 to 0.2 gram per square centimeter (cm). The C/C composite substrate was heated at a temperature of about 1400° C. and a pressure of about 100 mTorr for about one hour.

Figure 6:
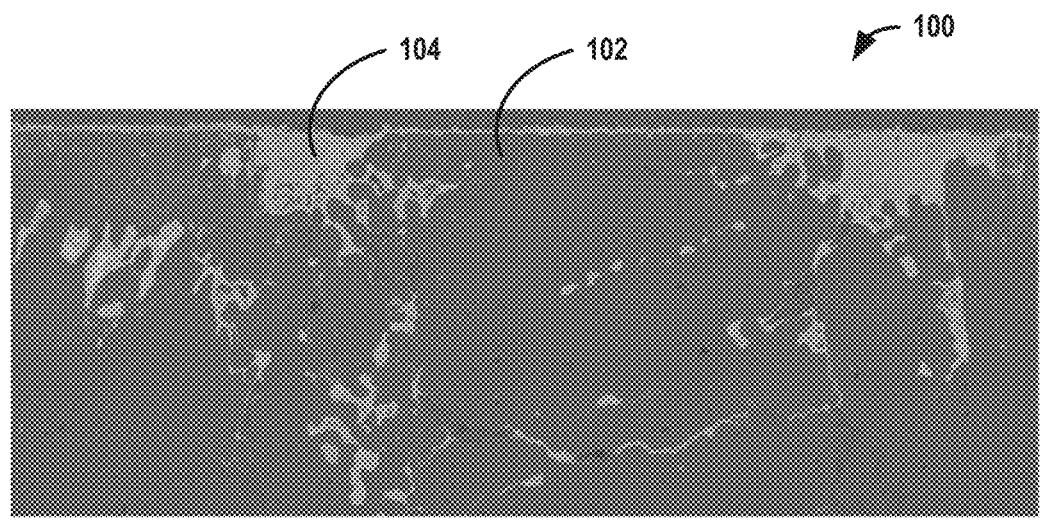
FIG. 6 is a micrograph of a cross-section of an example article that includes a C/C composite substrate and a high temperature coating, according to examples of the disclosure.

FIG. 6 is a micrograph of a cross-section of an example article 100 that includes a C/C composite substrate 102 and a high temperature coating 104, according to examples of the disclosure. As shown in FIG. 6, the silicon migrated into various surface voids, such as pores and defects, in the surface of substrate 102 to react with the carbon powder and form a dense high temperature coating 104.

In a second example, a high temperature silicon carbide coating was formed on an example aircraft rotor segment that includes a C/C composite substrate. The high temperature coating was formed on the aircraft rotor segment as described above.

Figure 7A:
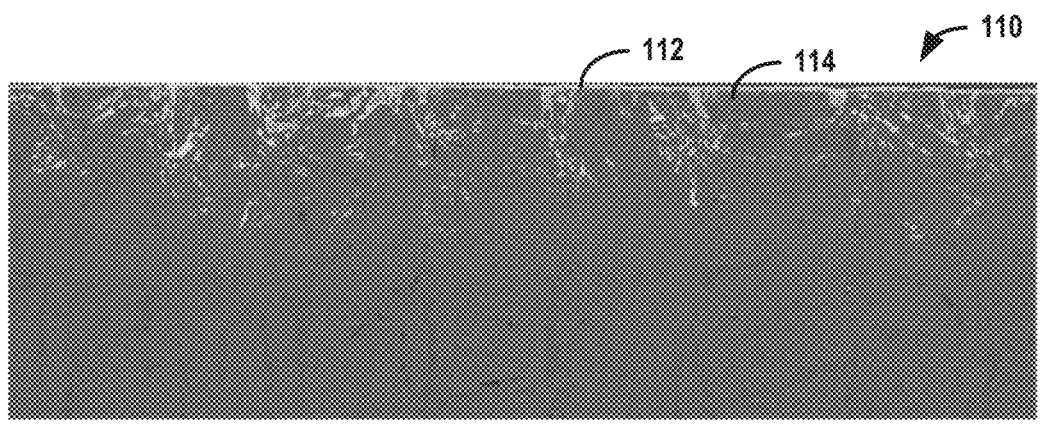
FIG. 7A is a micrograph of a cross-section at an outer diameter of an example aircraft rotor segment that includes a C/C composite substrate and a high temperature coating, according to examples of the disclosure.
Figure 7B:
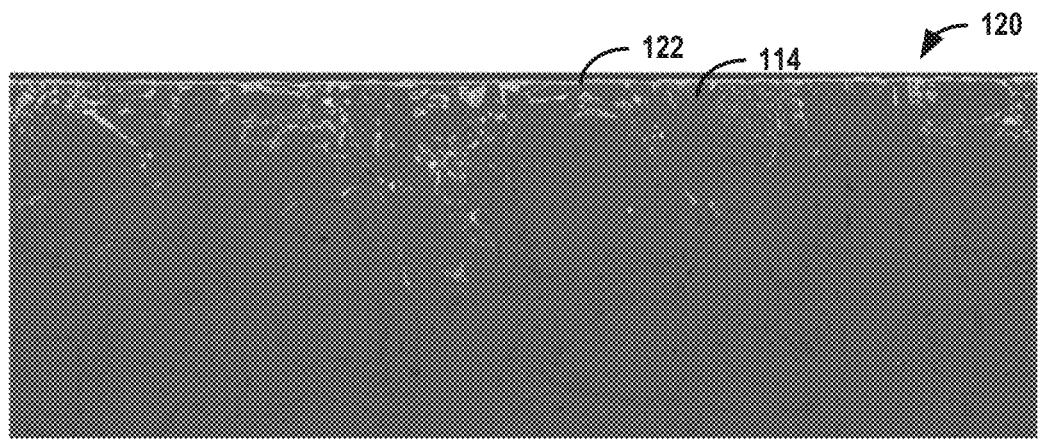
FIG. 7B is a micrograph of a cross-section at an inner diameter of an example aircraft rotor segment that includes a C/C composite substrate and a high temperature coating, according to examples of the disclosure.
Figure 7C:
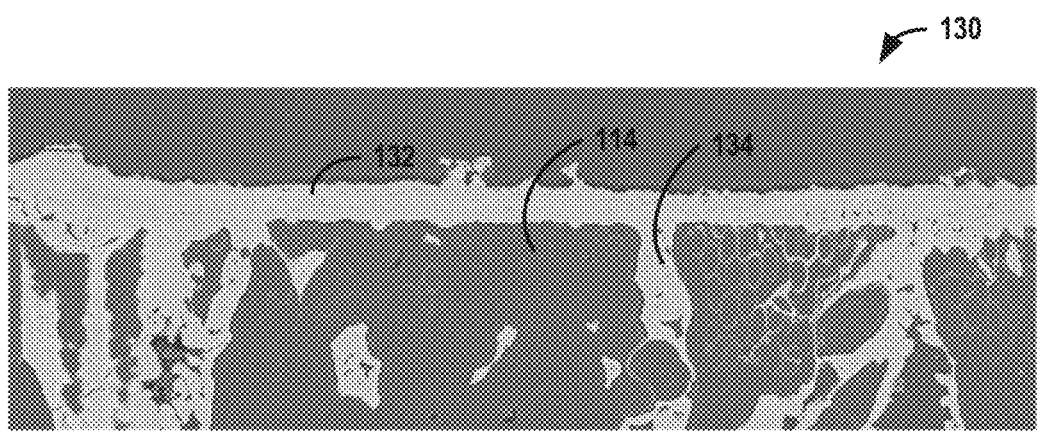
FIG. 7C is a micrograph of a cross-section of an example aircraft rotor segment that includes a C/C composite substrate and a high temperature coating, according to examples of the disclosure.

FIG. 7A is a micrograph of a cross-section of a portion 110 of the C/C composite substrate at an outer diameter of the example aircraft rotor segment, FIG. 7B is a micrograph of a cross-section a portion 120 of the C/C composite substrate at an inner diameter of the example aircraft rotor segment, and FIG. 7C is a zoomed-in micrograph of a cross-section of a portion 130 of the example aircraft rotor segment, according to examples of the disclosure. As seen in FIGS. 7A and 7B, the silicon carbide coating 112 and 122 extends across the surface of the C/C substrate 114 to form a relatively homogeneous and uniform high temperature antioxidant coating. As seen in FIG. 7C, the silicon carbide coating 132 may extend into voids 134 of the C/C composite substrate 114 to substantially seal the voids 134 from oxidizing species.

In a third example, high temperature silicon carbide coatings were formed on six C/C composite substrates. The high temperature coatings were formed as described with respect to the first example above using different vapor pressures to control a concentration of silicon metal in stoichiometric excess during the reaction between carbon and silicon.

Figure 8:
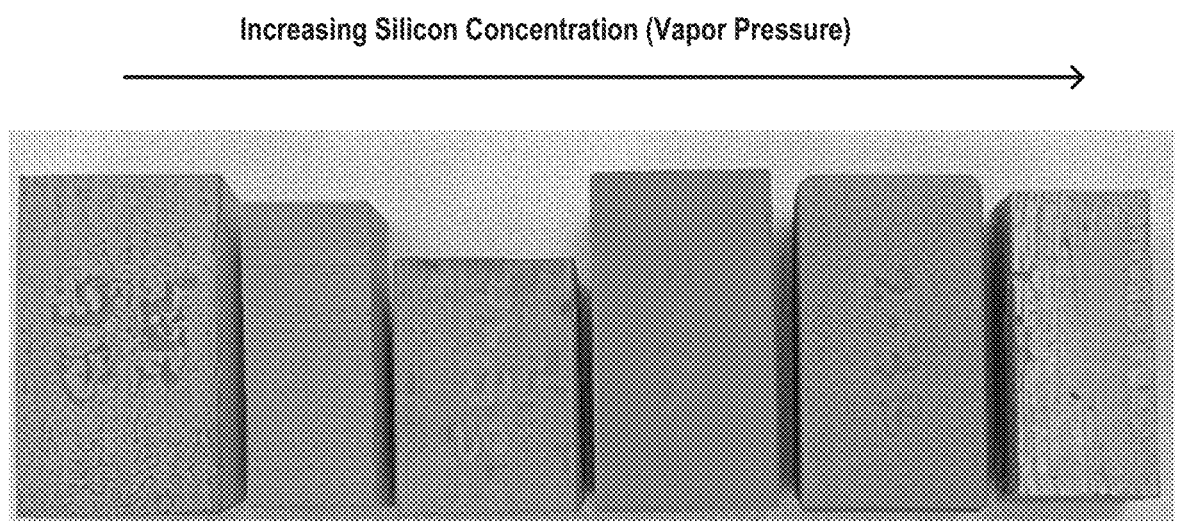
FIG. 8 is a photograph of example C/C composite substrates coated at various vapor pressures to form a high temperature coating, according to examples of the disclosure.

FIG. 8 is a photograph of example C/C composite substrates coated at various vapor pressures to form a high temperature coating, according to examples of the disclosure.

Various examples have been described. These and other examples are within the scope of the following claims.

What is claimed is:

1. A method for forming a coating, comprising:
    applying carbon powder to a surface of a carbon/carbon (C/C) composite substrate to force the carbon powder into one or more surface voids of the surface of the C/C composite substrate, wherein the carbon powder is retained in the one or more surface voids between about 50 vol % and about 60 vol % packing, and wherein the carbon powder has a substantially same composition and morphology as a surface portion of the C/C composite substrate;
    applying a metal slurry to the surface of the C/C composite substrate following the application of the carbon powder; and
    reacting a metal of the metal slurry with carbon of the carbon powder and carbon of the surface portion of the C/C composite substrate to form a metal-rich antioxidant layer of a metal carbide on the C/C composite substrate, wherein a surface of the metal-rich antioxidant layer includes the metal carbide formed from the carbon of the carbon powder and the metal carbide formed from the carbon of the surface portion of the C/C composite substrate.

2. The method of claim 1, wherein applying the carbon powder to the surface of the C/C composite substrate comprises mechanically abrading the surface portion of the C/C composite substrate to generate the carbon powder from the surface portion of the C/C composite substrate and force the carbon powder into the one or more surface voids.

3. The method of claim 1, wherein the metal of the metal slurry is maintained at stoichiometric excess during the reaction to form the metal-rich antioxidant layer of the metal carbide.

4. The method of claim 1, wherein reacting the metal of the metal slurry with the carbon of the carbon powder comprises:
    heating the surface of the C/C composite substrate above a melting point of the metal; and
    maintaining a vapor pressure of the metal at the surface of the C/C composite substrate corresponding to stoichiometric excess of the metal.

5. The method of claim 1, wherein the metal slurry comprises metal particles coated by a layer of a metal oxide, wherein the metal of the metal oxide is different from the metal of the metal carbide, and wherein the method further comprises forming an outer layer of the metal oxide on the metal-rich antioxidant layer using at least a portion of the metal oxide from the metal slurry.

6. The method of claim 1, wherein the metal slurry comprises at least one of silicon, titanium, or tungsten.

7. The method of claim 1, wherein a thickness of the metal-rich antioxidant layer is less than about 30 micrometers.

8. The method of claim 1, wherein an average diameter of the carbon powder is less than about 20 micrometers.

9. The method of claim 1, wherein the carbon powder is a first carbon powder, wherein the metal slurry is a first metal slurry, and wherein the method comprises:
    applying a second carbon powder to the surface of the metal-rich antioxidant layer to force the second carbon powder into one or more surface voids in the surface of the metal-rich antioxidant layer;
    applying a second metal slurry to the surface of the metal-rich antioxidant layer; and
    reacting a metal of the second metal slurry with carbon of the second carbon powder to form a metal carbide in the one or more surface voids in the surface of the metal-rich antioxidant layer.

10. The method of claim 9, wherein applying the second carbon powder to the surface of the metal-rich antioxidant layer comprises applying a carbon powder slurry or dry rub that includes the carbon powder to the surface of the metal-rich antioxidant layer.

11. The method of claim 10, wherein the second carbon powder is generated from processing the C/C composite substrate.

12. The method of claim 2, wherein the coating includes a single metal-rich antioxidant layer.

* * * * *